(12) United States Patent
Bae

(10) Patent No.: US 6,360,777 B1
(45) Date of Patent: Mar. 26, 2002

(54) HIGH PRESSURE HOSE PARTICULARLY SUITABLE FOR AUTOMOTIVE FUEL DELIVERY SYSTEM

(75) Inventor: Yeon-No Bae, Ulsan (KR)

(73) Assignee: Kyundai Motor Company, Seoul (KR)

( * ) Notice: Subject to any disclaimer, the term of this patent is extended or adjusted under 35 U.S.C. 154(b) by 0 days.

(21) Appl. No.: 09/672,120

(22) Filed: Sep. 27, 2000

(30) Foreign Application Priority Data

Dec. 24, 1999 (KR) .............................................. 99-62092

(51) Int. Cl.[7] .................................................. F16L 55/04
(52) U.S. Cl. ........................... 138/30; 138/42; 138/129; 181/281
(58) Field of Search .............................. 138/30, 40, 42, 138/44, 129, 135; 181/222, 232, 238, 256, 257, 275, 281; 60/469

(56) References Cited

U.S. PATENT DOCUMENTS

| | | | | |
|---|---|---|---|---|
| 4,611,633 A | * | 9/1986 | Buchholz et al. | 138/26 |
| 4,788,089 A | * | 11/1988 | Skipper | 138/129 |
| 5,094,271 A | * | 3/1992 | Fritz et al. | 138/30 |
| 5,172,729 A | * | 12/1992 | Vantellini | 138/26 |
| 5,201,343 A | * | 4/1993 | Zimmermann et al. | 138/30 |
| 5,468,057 A | * | 11/1995 | Megerle et al. | 138/44 |
| 5,475,976 A | * | 12/1995 | Phillips | 181/256 |
| 5,495,711 A | * | 3/1996 | Kalkman et al. | 138/26 |
| 5,539,164 A | * | 7/1996 | Van Ruiten | 138/30 |
| 5,728,981 A | * | 3/1998 | Van Ruiten | 138/30 |
| 5,941,283 A | * | 8/1999 | Forte | 138/30 |
| 6,123,108 A | * | 9/2000 | Chen et al. | 138/44 |

* cited by examiner

*Primary Examiner*—James Hook
(74) *Attorney, Agent, or Firm*—Christie, Parker & Hale, LLP

(57) ABSTRACT

A high-pressure hose includes a rubber tube, a pair of steel tubes connected to each end of the rubber tube, and a pulsation damping member installed in the rubber tube, one end of the damping member being fixed in the steel tube connected to a downstream end of the rubber tube by means of a ring.

18 Claims, 3 Drawing Sheets

HIGH PRESSURE HOSE PARTICULARLY SUITABLE FOR AUTOMOTIVE FUEL DELIVERY SYSTEM

BACKGROUND OF THE INVENTION (a) Field of the Invention

The present invention relates to a high-pressure hose, and in particular, to an improved high pressure fuel hose capable of avoiding pulsation noise generated when fluid flows through the hose.

(b) Description of the Related Art

FIG. 1 shows a schematic diagram of a common automotive fuel supply to system used in a vehicle. Fuel stored in a fuel tank 2 is supplied to a high-pressure pump 8 via a fuel filter 6 by a fuel pump 4. Then, the fuel is fed to the fuel delivery system 10 by the high-pressure pump 8 so as to be injected to combustion chambers of an engine by fuel injectors (not shown) connected to the fuel delivery system, on the basis of signals from an Electronic Control Unit (ECU) 12. Surplus fuel not used in the fuel delivery system 10 returns to the fuel tank 2 through return lines.

In this fuel supply system, as the fuel pump 4 delivers the fuel to the high pressure pump 8 with a relatively low pressure and the high pressure pump 8 feeds the fuel received from the fuel pump 4 to the fuel delivery system 10 with a high pressure, disposed between the high pressure pump 8 and the fuel delivery system 10 is a high pressure hose.

FIG. 5 shows a prior art high pressure hose. The high-pressure hose 100 is made out of a rubber material incorporating a reinforcement layer such as braided wire or textile.

Even though the reinforced high pressure hose 100 provides sufficient resistance to the high pressure, the reinforced high pressure hose has a drawback in that it can not dampen pulsations caused by the high pressure of the fluid flow. That is, since the high pressure pump is operated by a cam mechanism actuated by an engine, the high pressure pump periodically generates pressure, thereby generating pulsation causing a booming noise while a vehicle is driving or idling.

SUMMARY OF THE INVENTION

The present invention has been made in an effort to solve the above problems of the prior art.

It is an object of the present invention to provide an improved high pressure hose capable of damping a pulsation of fluid flow so as to avoid generation of booming noise caused by the pulsation.

To achieve the above object, the high-pressure hose of the present invention comprises a rubber tube, a pair of steel tubes connected to each end of the rubber tube, and a pulsation damping member installed in the rubber tube, one end of the damping member being fixed in the steel tube connected to a downstream end of the rubber tube by a ring.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 2:
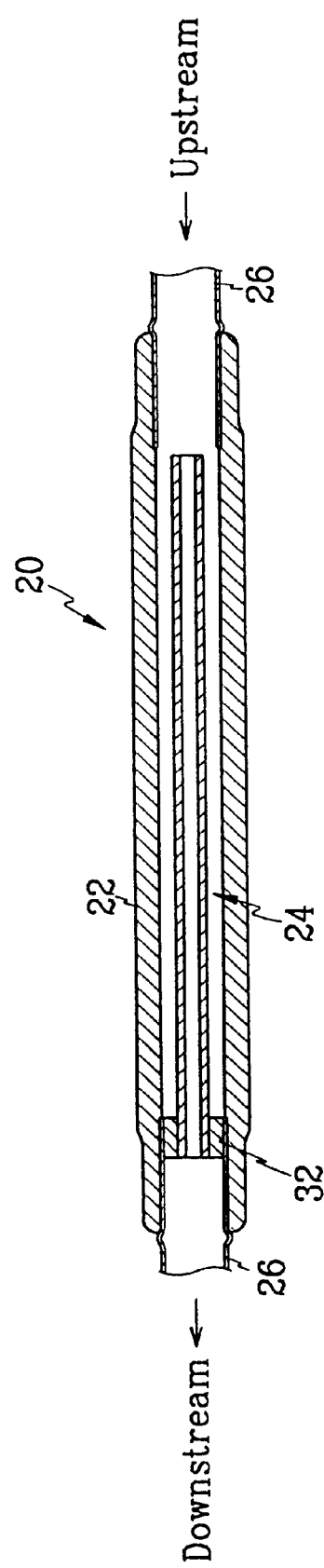
FIG. 2 is a sectional view of a high-pressure hose according to a preferred embodiment of the present invention.

FIG. 2 shows a high-pressure hose according to a preferred embodiment of the present invention.

A high-pressure hose 20 comprises a rubber tube 22 connected to steel pipes 26 at downstream and upstream ends and a pulsation damping member 24 fixed by a ring member 32 at a downstream end of the rubber tube 22, the ring member 32 being tightly fitted in to the steel pipe 26 connected to the downstream end of the rubber tube 22.

The rubber tube 22 incorporates reinforcement layers such as braided wire or textile for providing sufficient pressure resistance.

Figure 3:
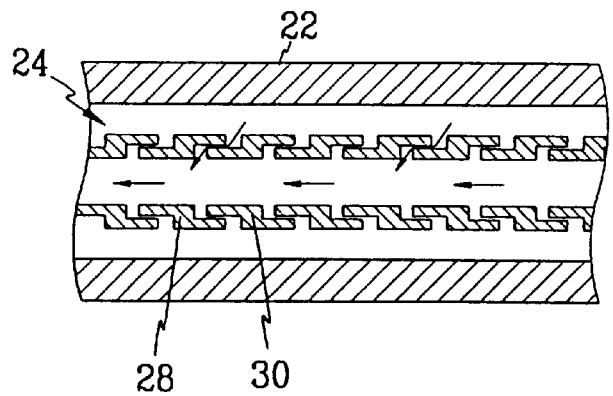
FIG. 3 is a partial enlarged view of the high-pressure hose depicted in FIG. 2.

The pulsation damping member 24 is formed by spirally winding a plastic strip 28 which is stepped in a widthwise direction such that the plastic strip 28 is continuously overlapped along each side by the adjacent spiral, with a gap between the overlaps (see FIG. 3). Accordingly, the windings of the plastic strip 28 form a pipe of which the downstream end is fixed at the rubber tube 22 by the ring 32, and the upstream end remains free. The downstream end of the hose 20 is opened by only an opening of the downstream end of the pulsation damping member 24 and is sealed by the ring 32 such that the fluid can flow out through the opening of the pulsation damping member 24. The upstream end of the pulsation member 24 is an opened free end.

The operation of the high-pressure hose according to the preferred embodiment of the present invention will be described hereinafter.

Figure 1:
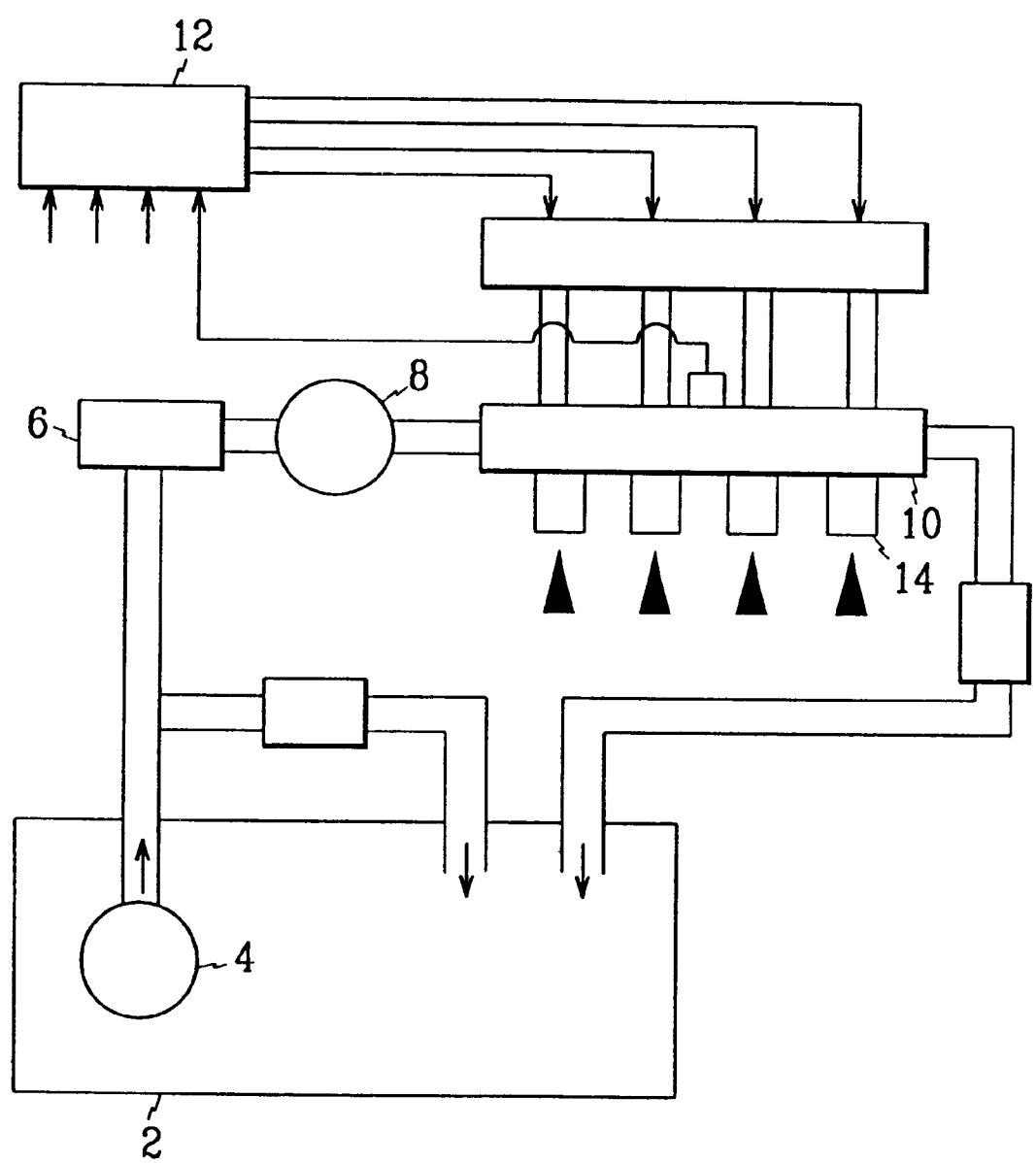
FIG. 1 is a schematic diagram of a common automotive fuel supply system.

Once the fluid is introduced into the high-pressure hose 20 by a pumping operation of the high-pressure pump 8 (see FIG. 1), the fluid flows through both the inner and outer channels of the pulsation damping member 24. However, the fluid flowing through the outer channel of the pulsation damping member 24 cannot proceed because the downstream end of the pulsation damping member 24 is circumferentially sealed by a ring 32 such that the fluid squeezes into the inner channel through the gap spirally formed along the pulsation damping member 24. Accordingly, the pulsations generated by periodic pumping operations of the high-pressure pump 8 are dampened while the fluid in the outer channel is squeezed into the inner channel of the pulsation damping member 24.

Figure 4:
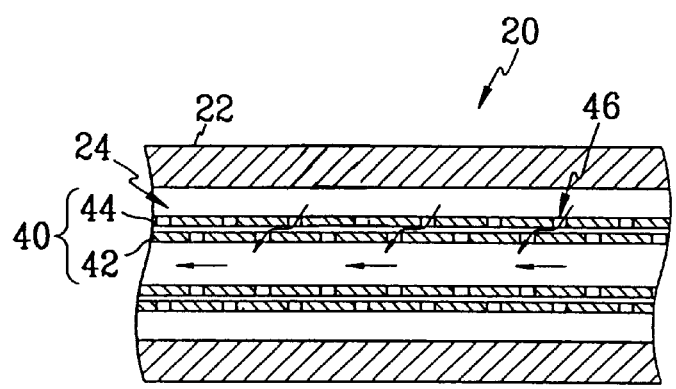
FIG. 4 is a partial enlarged view of a high pressure hose according to another preferred embodiment of the present invention.
Figure 5:
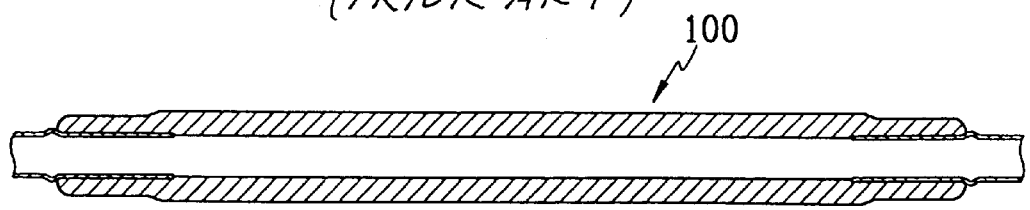
FIG. 5 is a sectional view of a prior art high-pressure hose.

FIG. 4 is a partial enlarged view showing the high pressure hose according to another preferred embodiment of the present invention.

As shown in FIG. 4, in this embodiment, a dual pulsation damping member 40 is installed in the rubber pipe 22. The dual pulsation damping member 40 comprises inner and outer pipes 42 and 44 that are formed in such a way that a plurality of passage holes 46 are alternatively formed in both pipes 42 and 44 in their longitudinal direction. Accordingly, the fluid in the outer channel of the pulsation damping member 24 squeezes into the inner channel via the holes 46 of the inner and outer pipes 42 and 44. The damping effect of the dual pulsation damping member 40 according to the second preferred embodiment is identical to that of the pulsation damping member 24 according to the first preferred embodiment.

Though the inner and outer pipes can be made out of steel, it is preferred to use plastic pipes because of lower manufacturing costs.

As described above, since the high-pressure hose according to the first and second preferred embodiments is provided with the pulsation damping member, the pulsations generated by periodical pumping operations of the high-pressure pump are dampened while the fluid in the outer channel is squeezed into the inner channel of the pulsation damping members. Furthermore, by preventing the fluid from fluctuating in the hose, the pulsation noise which is generated can be reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A high pressure hose for interconnecting a downstream pipe and an upstream pipe, the high pressure hose comprising:
    a rubber tube; and
    a pulsation damping member installed in the rubber tube, one end of the damping member being fixed to a downstream end portion of the rubber tube by a ring, wherein the pulsation damping member is formed in a tube shape having an inner and an outer surface and defined by spirally winding a rigid strip, and wherein the strip has a cross-section defining a step such that a gap is formed between overlapping portions thereof while winding the strip providing a fluid permeable path between the inner and outer surfaces of the damping member.

2. A high pressure hose of claim 1 wherein the ring is tightly fitted into a steel pipe connected to the downstream end of the rubber tube.

3. A high pressure hose of claim 1 wherein the rigid strip is a plastic strip.

4. A high pressure hose of claim 1 wherein the rigid strip is a steel strip.

5. A high pressure hose for interconnecting a downstream pipe and an upstream pipe, the high pressure hose comprising:
    a rubber tube; and
    a pulsation damping member comprising and inner pipe within an outer pipe, wherein the damping member is installed in the rubber tube, one end of the damping member is fixed to a downstream end portion of the rubber tube by a ring, wherein each of said inner and outer pipes comprises a plurality of holes extending from an outer surface of the pipe to an inner surface of said pipe, and wherein the holes of the inner pipe are staggered relative to the holes of the outer pipe.

6. A high pressure hose of claim 5 wherein the ring is tightly fitted into a steel pipe connected to the downstream end of the rubber tube.

7. A high pressure hose for interconnecting a downstream pipe and an upstream pipe, the high pressure hose comprising:
    a rubber tube; and
    a pulsation damping member for dampening pulsations generated by fluid flowing along the rubber tube, the pulsation damping member dividing a passage of the rubber tube into inner and outer channels such that the fluid flowing along the outer channel squeezes into the inner channel through a gap formed on the pulsation damping member, wherein the pulsation damping member is formed in a tube shape having an inner and an outer surface and defined by spirally winding a rigid strip, wherein the rigid strip has a cross-section defining a step such that a gap is formed between overlapping portions thereof while winding the rigid strip providing a fluid permeable path between the outer and the inner surfaces of the damping member.

8. A high pressure hose of claim 7 wherein one end of the damping member is fixed to a downstream end portion of the rubber tube by a ring.

9. A high pressure hose of claim 8 wherein the ring is tightly fitted into a steel pipe connected to the downstream end of the rubber tube.

10. A high pressure hose of claim 7 wherein the rigid strip is a plastic strip.

11. A high pressure hose of claim 7 wherein the rigid strip is a steel strip.

12. A high pressure hose for interconnecting a downstream pipe and an upstream pipe, the high pressure hose comprising:
    a tube having an inner passage; and
    a tubular pulsation damping member for dampening pulsations generated by fluid flowing along the rubber tube, the pulsation damping member fitted within the tube passage and dividing the passage into an inner channel internal of the damping member and an outer channel external of the damping member, wherein a downstream portion of the tubular pulsating damping member is fixedly coupled to a downstream end portion of the tube providing a block to the flow path through the outer channel, and wherein both the inner and outer channels open into the upstream end of the tube.

13. A high pressure hose of claim 12 further comprising a ring for coupling the damping member to the tube.

14. A high-pressure hose of claim 12 wherein the ring is tightly fitted into a steel pipe connected to a downstream end of the tube.

15. A high pressure hose of claim 12 wherein the pulsation damping member comprises an inner pipe within an outer pipe and wherein each of said inner and outer pipe comprises holes extending from an outer surface to inner surface of said pipe.

16. A high pressure hose of claim 12 wherein the holes of the outer pipe are staggered in relation of the holes of the inner pipe.

17. A high pressure hose for interconnecting a downstream pipe and an upstream pipe, the high pressure hose comprising:

a rubber tube; and a pulsation damping member comprising an inner pipe within an outer pipe for dampening pulsations generated by fluid flowing along the rubber tube, the pulsation damping member dividing a passage of the rubber tube into inner channel internal of the inner pipe and an outer channel external of the outer pipe, wherein each of the inner and outer pipes comprises a plurality of holes extending from the pipe outer surface to the pipe inner surface, wherein the holes formed on the outer pipe are staggered relative to the holes formed on the inner pipe and wherein fluid flowing along the outer channel squeezes into the inner channel through the holes formed on the inner and outer pipes of the pulsation damping member.

18. A high-pressure hose for interconnecting a downstream pipe and an upstream pipe, the high pressure hose comprising:

a rubber tube comprising an upstream end and a downstream end; and a pulsation damping member formed by a spirally wound rigid strip and installed in the rubber tube, one end of the damping member being fixed to the downstream end of the rubber tube by a ring, wherein the strip has a step cross-section shape such that a fluid permeable gap is formed between overlapping portions of the wound strip.

* * * * *